United States Patent
King et al.

(10) Patent No.: US 7,629,982 B1
(45) Date of Patent: *Dec. 8, 2009

(54) OPTIMIZED ALPHA BLEND FOR ANTI-ALIASED RENDER

(75) Inventors: Gary C. King, San Jose, CA (US); Luke Y. Chang, San Mateo, CA (US); Steven E. Molnar, Chapel Hill, NC (US); David K. McAllister, Holladay, UT (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/332,366

(22) Filed: Dec. 11, 2008

Related U.S. Application Data

(63) Continuation of application No. 11/105,198, filed on Apr. 12, 2005, now Pat. No. 7,479,965.

(51) Int. Cl.
- *G06T 17/00* (2006.01)
- *G09G 5/00* (2006.01)
- *G09G 5/02* (2006.01)
- *G09G 5/36* (2006.01)
- *G06F 13/00* (2006.01)
- *G06K 9/40* (2006.01)
- *G06K 9/54* (2006.01)

(52) U.S. Cl. .................. 345/592; 345/556; 345/428; 345/606; 345/536; 382/254; 382/274; 382/300; 382/305

(58) Field of Classification Search .............. 345/558, 345/561, 564–565
See application file for complete search history.

(56) References Cited

U.S. PATENT DOCUMENTS

| | | | |
|---|---|---|---|
| 5,852,443 A * | 12/1998 | Kenworthy | 345/441 |
| 5,940,080 A | 8/1999 | Ruehle et al. | |
| 6,154,195 A | 11/2000 | Young et al. | |
| 6,407,736 B1 | 6/2002 | Regan | |
| 6,525,723 B1 | 2/2003 | Deering | |
| 6,591,398 B1 * | 7/2003 | Kondo et al. | 714/2 |
| 6,927,781 B1 * | 8/2005 | Kong | 345/613 |
| 6,999,100 B1 * | 2/2006 | Leather et al. | 345/611 |
| 7,050,068 B1 | 5/2006 | Bastos et al. | |
| 7,479,965 B1 * | 1/2009 | King et al. | 345/589 |
| 2002/0010793 A1 * | 1/2002 | Noll et al. | 709/240 |
| 2002/0097241 A1 * | 7/2002 | McCormack et al. | 345/423 |
| 2002/0180748 A1 | 12/2002 | Popescu et al. | |
| 2003/0189575 A1 | 10/2003 | Coleman et al. | |
| 2004/0130552 A1 | 7/2004 | Duluk et al. | |
| 2005/0041037 A1 | 2/2005 | Dawson | |

* cited by examiner

*Primary Examiner*—Wesner Sajous
(74) *Attorney, Agent, or Firm*—Townsend and Townsend and Crew LLP

(57) ABSTRACT

Circuits, methods, and apparatus that reduce the amount of data transferred between a graphics processor integrated circuit and graphics memory. Various embodiments of the present invention further improve the efficiency of blenders that are included on a graphics processor. One embodiment provides for the storage of a reduced number of subsamples of a pixel when the storage of a larger number of subsamples would be redundant. The number of subsamples that are blended with source data are compressed, thereby reducing the task load on the blenders increasing their efficiency. These methods can be disabled to avoid errors that may arise in certain applications.

20 Claims, 14 Drawing Sheets

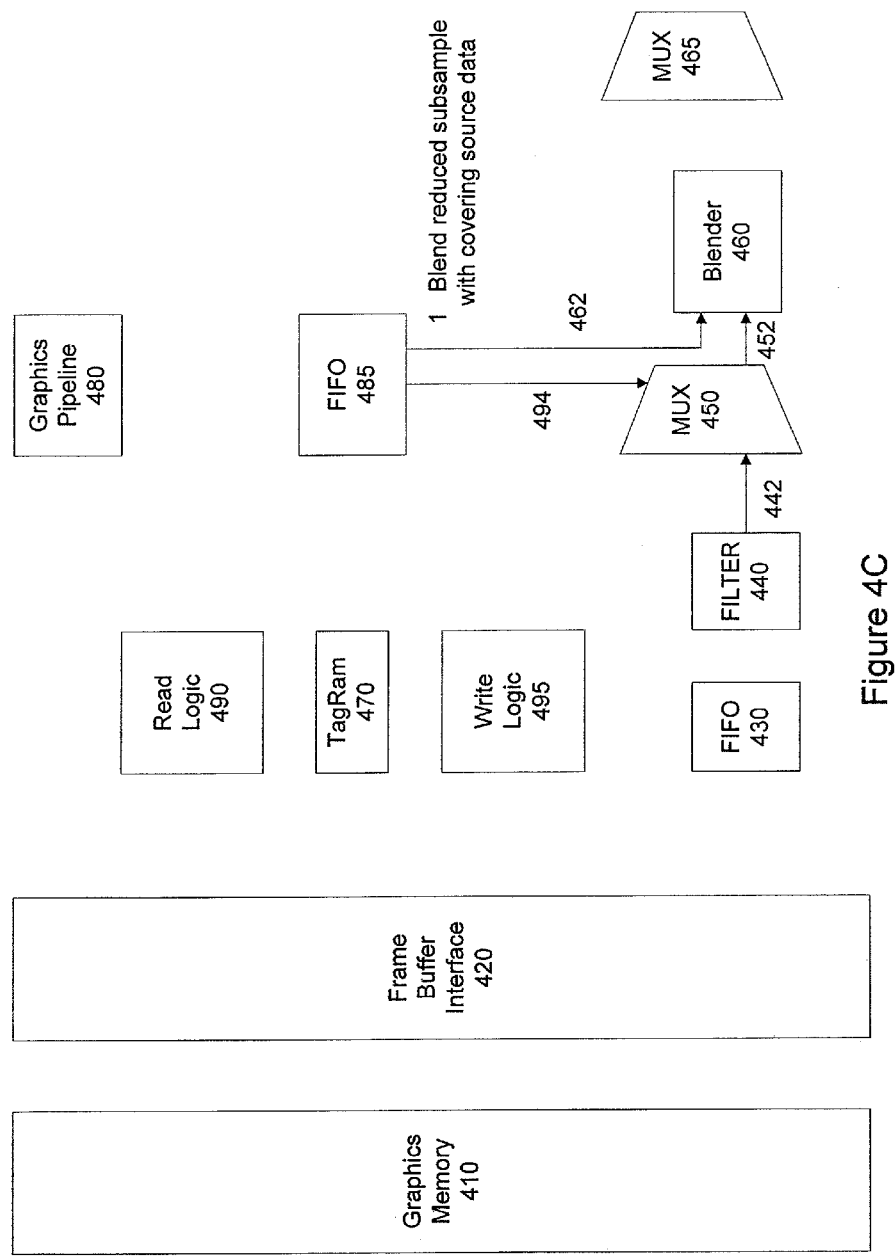

OPTIMIZED ALPHA BLEND FOR ANTI-ALIASED RENDER

CROSS-REFERENCES TO RELATED APPLICATIONS

This application is a continuation of U.S. patent application Ser. No. 11/105,198, filed Apr. 12, 2005, which is incorporated by reference.

BACKGROUND

The present invention relates generally to graphics processing, and more particularly to improving the efficiency of various circuits and methods used by a graphics processor integrated circuit.

In typical computer systems, graphics processors generate images for display on a monitor. The displayed image can be as static as a text document or as dynamic as the latest computer or video game. In the latter application, the demand by users for increasingly realistic images has become insatiable. In an attempt to appease this appetite, the performance of graphics processors has been rapidly improved.

As the performance of graphics processors has been improved, the workload has become particularly burdensome on a few specific circuits. For example, the amount of data transferred between a graphics processor and its memory, which is referred to as a graphics memory, has increased dramatically. So much so that now, the performance of some graphics processors is limited by the available bandwidth or data transfer capacity between the processor and its memory. Blenders, which are circuits that combine or merge colors of overlapping structures in an image, are similarly overworked.

In general, there are two ways to improve the performance of a circuit such as a memory interface or blender in a graphics processor. Specifically, the processing capacity of the circuit can be increased, for example, by increasing the clock rate or number of circuits. Also, more efficient use can be made of the available circuits.

The clock rate for memory interfaces and blender circuits can be increased, but their clock rate tends to be limited by the process technology used in the manufacture of the graphics processor or memory integrated circuits. Also, more blenders can be added, but these tend to be very large circuits that consume significant die area and thus increase device cost.

Thus, it is desirable to increase the efficiency of data transfers between a graphics processor and its graphics memory. Also, it is desirable to increase the efficiency of the blenders on a graphics processor integrated circuit.

SUMMARY

Accordingly, embodiments of the present invention provide circuits, methods, and apparatus that reduce the amount of data transferred between a graphics processor integrated circuit and graphics memory. Various embodiments further improve the efficiency of blenders that are included on the graphics processor.

One exemplary embodiment of the present invention reduces the amount of data transferred between a graphics processor and its memory by storing a reduced number of subsamples for a pixel under certain circumstances. Specifically, in a system where multiple subsamples per pixel are used for anti-aliasing, in situations where anti-aliasing is not critical, a reduced number of subsamples are stored in memory. This is referred to as compression.

As an example, when each subsample of a pixel is covered by opaque source data, only one subsample is stored since each of the subsamples has the same value. Also, when each of the subsamples of a pixel are covered by translucent source data (that is, source data having an alpha less than one) the subsamples are filtered or reduced before blending. This reduced number of subsamples can then be blended with the translucent source data, and the result of the blend can be stored. This not only limits the data stored in memory, but reduces the work load on the blenders as well. If new source data that only partly covers a pixel is received, then anti-aliasing is needed, and the full number of subsamples is blended and stored in memory. The decision to compress pixels may be made pixel-by-pixel, or by tile, or by other group of pixels or subsamples.

In various embodiments, the subsamples are filtered in a linear manner, that is, the average of the subsamples is taken. In some applications, this can lead to undesirable results. For these applications, the reduction in the number of subsamples can be disabled. In other embodiments, other types of non-linear filtering can be used, and these may be enabled or disabled under appropriate circumstances.

Some amount of loss may occur in rare circumstances where subsamples are compressed. For example, if a pixel's subsamples having different values are compressed, and source data that only partly covers the pixel is received later, the subsamples have a different final value than they would if no compression was previously done. In various embodiments, this loss is limited by the use of a threshold value. Specifically, if the subsamples of a pixel vary in color by more than this threshold amount, compression is not done. In other embodiments, compression is not done unless the subsamples each have the same value, that is, the threshold is set at zero. Various embodiments of the present invention may incorporate one or more of these and the other features discussed herein.

One exemplary embodiment of the present invention provides a method of generating a pixel for display. This method includes receiving a source data primitive, the source data primitive covering one or more pixels including a first pixel, reading a first number of subsamples for the first pixel from a first number of memory locations, reducing the first number of subsamples for the first pixel to a second number, blending the second number of subsamples for the first pixel with the received source data primitive to generate a second number of new subsamples, and storing the second number of new subsamples in a second number of memory locations.

Another exemplary embodiment of the present invention provides a method of generating pixels for display. This method includes receiving a first source data primitive, the first source data primitive completely covering one or more pixels including a first pixel, storing a first number of subsamples for the first pixel, receiving a second source data primitive, the second source data primitive partially covering one or more pixels including a second pixel, and storing a second number of subsamples for the second pixel, wherein the first number is less than the second number.

A further exemplary embodiment of he present invention provides another method of generating a pixel for display. If compression is enabled, this method includes receiving a source data primitive, the source data primitive covering one or more pixels including a first pixel, reading a first number of subsamples for the first pixel from a first number of memory locations, reducing the first number of subsamples for the first pixel to a second number, blending the second number of subsamples for the first pixel with the received source data primitive to generate a second number of new subsamples, and storing the second number of new subsamples in a second number of memory locations.

If compression is disabled, this method includes receiving the source data primitive, the source data primitive covering one or more pixels including the first pixel, reading the first number of subsamples for the first pixel from the first number of memory locations, blending the first number of subsamples for the first pixel with the received source data primitive to generate a first number of new subsamples, and storing the first number of new subsamples in a first number of memory locations. In this method, when the source data primitive covers one or more pixels including the first pixel (for example, a tile), the number of subsamples stored in memory for the first pixel is reduced when compression is enabled.

A better understanding of the nature and advantages of the present invention may be gained with reference to the following detailed description and the accompanying drawings.

BRIEF DESCRIPTION OF THE DRAWINGS

FIGS. 4A-4D illustrate the flow of data in the portion of the graphics processor shown in FIG. 3 when translucent source data that covers a tile is received;

DESCRIPTION OF EXEMPLARY EMBODIMENTS

Figure 1:
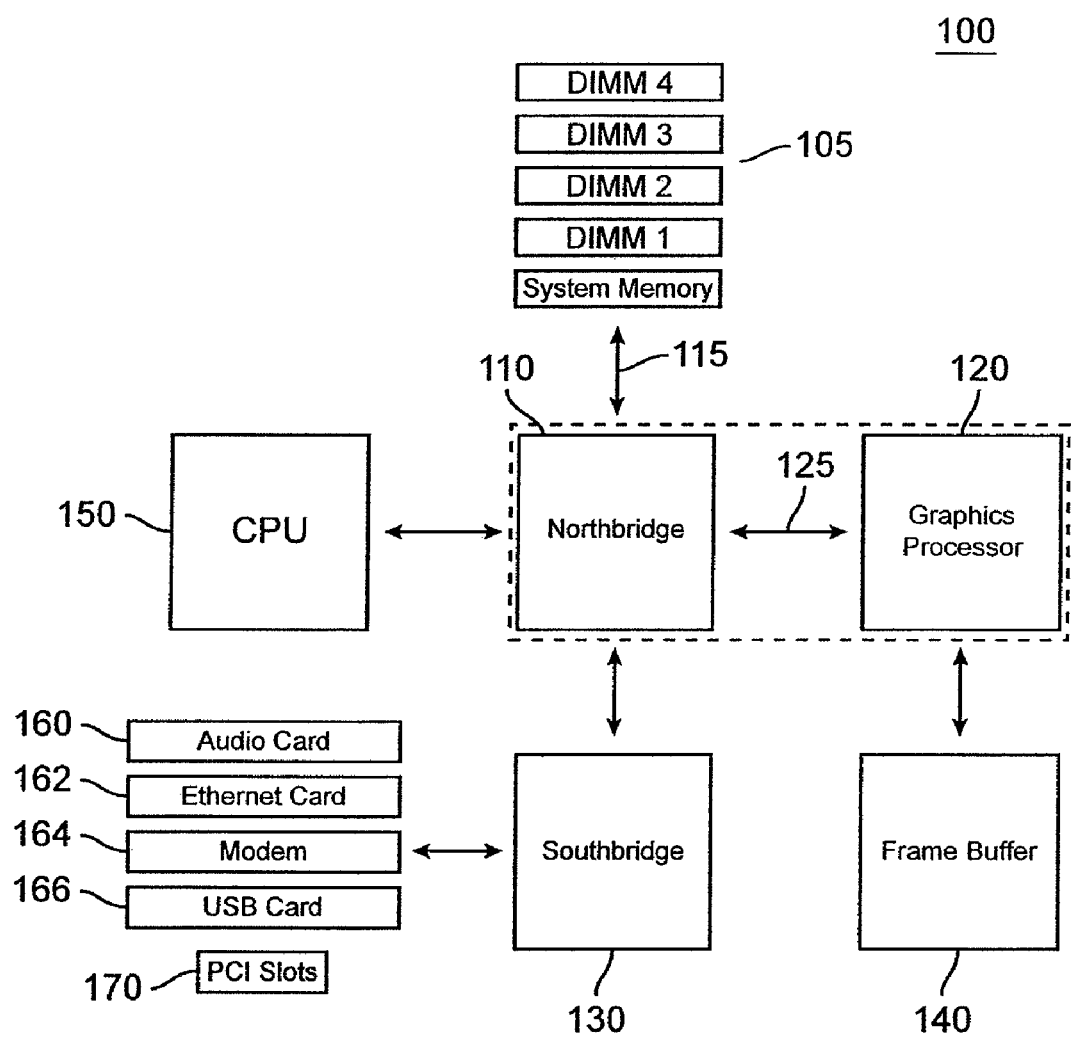
FIG. 1 is a block diagram of a computing system that benefits by incorporation of embodiments of the present invention.

FIG. 1 is a block diagram of a computing system 100 that benefits by incorporation of embodiments of the present invention. This computing system 100 includes a Northbridge 110, graphics processor 120, Southbridge 130, frame buffer 140, central processing unit (CPU) 150, audio card 160, Ethernet card 162, modem 164, USB card 166, PCI slots 170, and memories 105. This figure, as with all the included figures, is shown for illustrative purposes only, and does not limit either the possible embodiments of the present invention or the claims.

The Northbridge 110 passes information from the CPU 150 to and from the memories 105, graphics processor 120, and Southbridge 130. Southbridge 130 interfaces to external communication systems through connections such as the universal serial bus (USB) card 166 and Ethernet card 162. The graphics processor 120 receives graphics information over the accelerated graphics port (AGP) bus 125 through the Northbridge 110 from CPU 150 and directly from memory or frame buffer 140. The graphics processor 120 interfaces with the frame buffer 140. Frame buffer 140 may include a display buffer that stores pixels to be displayed.

In this architecture, CPU 150 performs the bulk of the processing tasks required by this computing system. In particular, the graphics processor 120 relies on the CPU 150 to set up calculations and compute geometry values. Also, the audio or sound card 160 relies on the CPU 150 to process audio data, positional computations, and various effects, such as chorus, reverb, obstruction, occlusion, and the like, all simultaneously. Moreover, the CPU 150 remains responsible for other instructions related to applications that may be running, as well as for the control of the various peripheral devices connected to the Southbridge 130.

Figure 2:
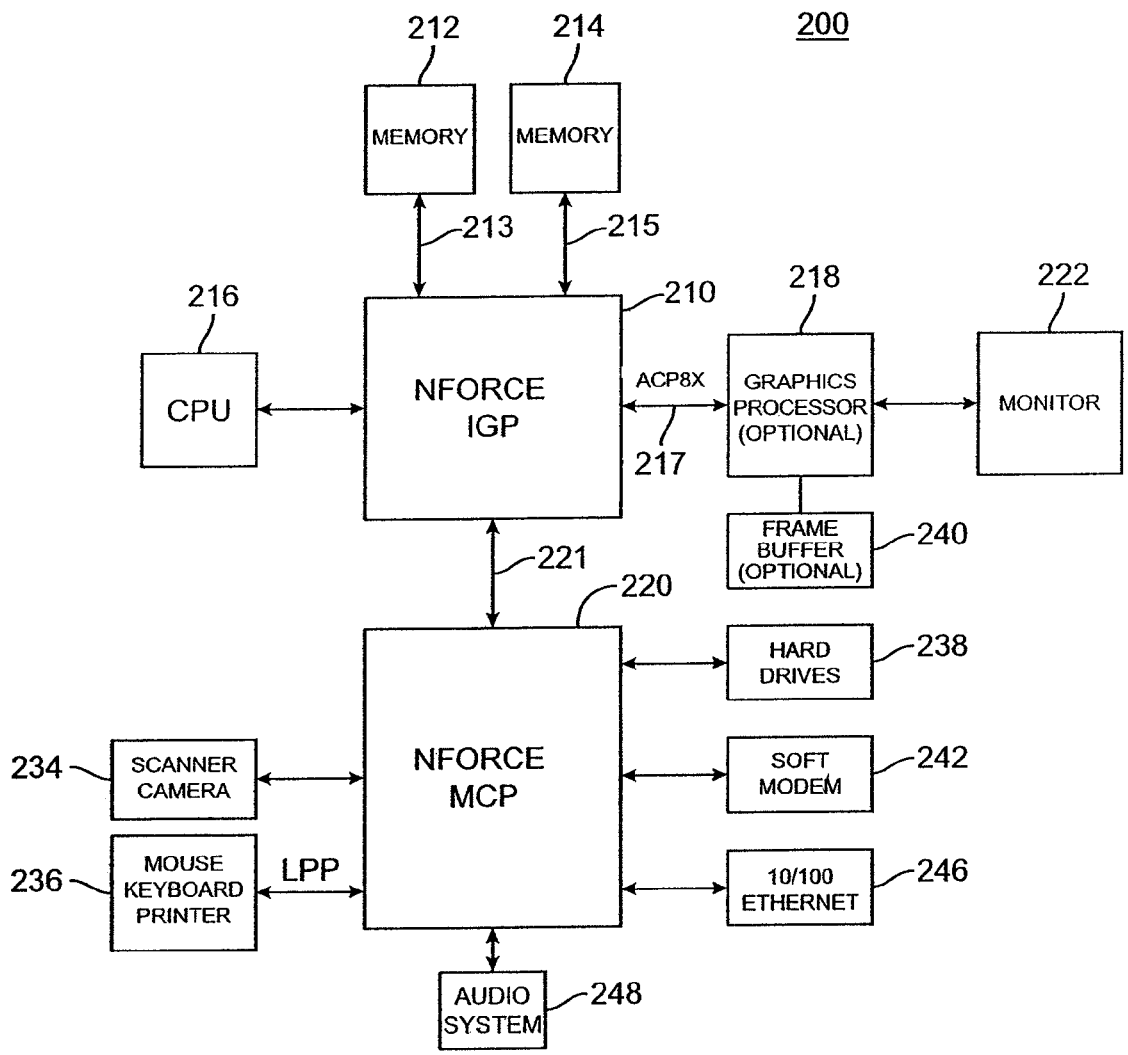
FIG. 2 is a block diagram of an improved computer system that benefits by incorporation of embodiments of the present invention.

FIG. 2 is a block diagram of an improved computer system 200 that benefits by incorporation of embodiments of the present invention. This improved computing system 200 includes an NVIDIA nForce™ integrated graphics processor (IGP) 210, an nForce media communications processor (MCP2) 220, memory 212 and 214, CPU 216, optional graphics processor 218 and frame buffer 240, monitor 222, scanner or camera 234, mouse, keyboard, and printer 236, hard drives 238, soft modem 242, Ethernet network or LAN 246, and audio system 248.

This revolutionary system architecture has been designed around a distributed processing platform, which frees up the CPU to perform tasks best suited to it. Specifically, the nForce IGP 210 includes a graphics processing unit (GPU) (not shown) which is able to perform graphics computations previously left to the CPU 216. Alternately, the nForce IGP 210 may interface to an optional GPU 218 which performs these computations. Also, nForce MCP2 220 includes an audio processing unit (APU), which is capable of performing many of the audio computations previously done by the CPU 216. In this way, the CPU is free to perform its tasks more efficiently. Also, by incorporating a suite of networking and communications technologies such as USB and Ethernet, the nForce MCP2 220 is able to perform much of the communication tasks that were previously the responsibility of the CPU 216.

In this architecture, the nForce IGP 210 communicates with memories 212 and 214 over buses 213 and 215. The nForce IGP 210 also interfaces to an optional graphics processor 218 over an advanced AGP bus 217. In various computer systems, optional processor 218 may be removed, and the monitor 222 may be driven by the nForce IGP 210 directly. In other systems, there may be more than one monitor 222, some or all of which are coupled to optional graphics processor 218 or the nForce IGP 210 directly. The nForce IGP 210 communicates with the nForce MCP2 220 over a HyperTransport™ link 221. The optional graphics processor 218 may also interface with external memory, which is not shown in this example. Embodiments of the present invention may be used to improve changes in the frequency of the clock signals at the interfaces to memories 212 and 214, from the optional graphics processor 218 to its external memory (not shown), or to other optional memories not shown here, or other memory interfaces or other circuits in other digital systems.

The nForce MCP2 220 contains controllers for Ethernet connections 246 and soft modem 242. The nForce MCP 220 also includes an interface for a mouse, keyboard, and printer 236, and USB ports for cameras and scanners 234 and hard drives 238.

This arrangement allows the CPU 216, the nForce IGP 210, and the nForce MCP2 220, to perform processing independently, concurrently, and in a parallel fashion.

Figure 3:
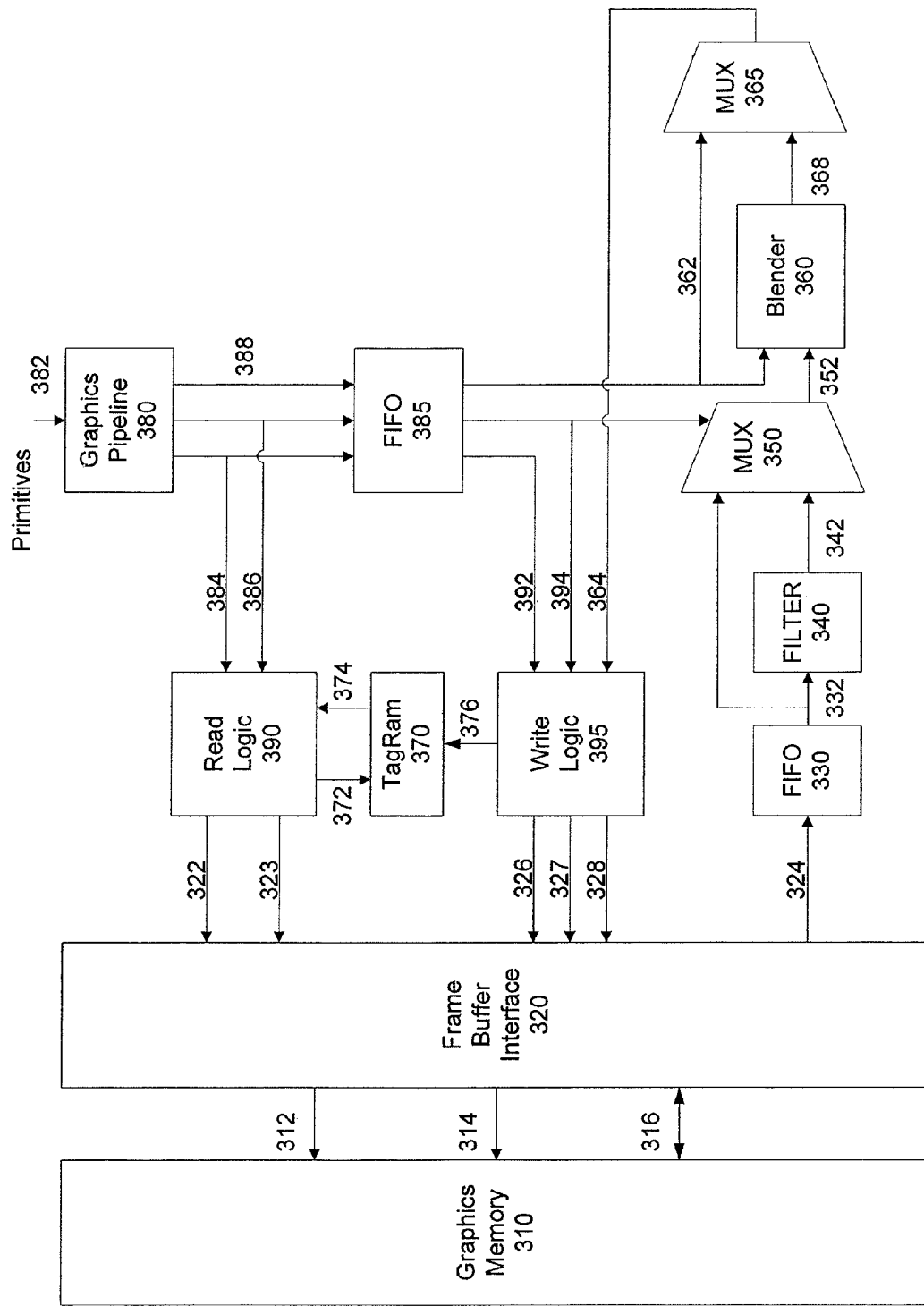
FIG. 3 is a block diagram of a portion of a graphics processor that may incorporate embodiments of the present invention.

FIG. 3 is a block diagram of a portion of a graphics processor that incorporates embodiments of the present invention. This block diagram includes a graphics memory 310, frame buffer interface 320, first-in-first-out (FIFO) memory 330, filter 340, filter bypass multiplexer 350, blender 360, blender bypass multiplexer 365, TAGRAM 370, graphics pipeline 380, FIFO 385, read logic 390, and write logic 395. Typically, the graphics memory 310 is made up of one or more memory integrated circuits, typically DRAMs, while the other circuitry is included on a graphics processor integrated circuit. This figure, as with the other included figures, is shown for illustrative purposes only, and does not limit either the possible embodiments of the present invention or the claims.

Data including source data primitives or triangles are received on bus 382 by the graphics pipeline 380. Typically, bus 382 is an AGP or PCI express bus coupled to a central processing unit, CPU 150 or 216, via a Northbridge 110 or IGP device 210. The graphics pipeline 380 provides source data to the remaining circuitry. Specifically, the graphics pipeline 380 provides coordinates on lines 384 and coverage information on lines 386 to the read logic circuit 390 and FIFO 385, and pixel colors on lines 388 to the FIFO 385. The read logic block 390 receives coordinates on lines 384 and coverage information on lines 386. The read logic block requests and reads data from the TAGRAM 370 and provides read requests to the frame buffer interface 320. The frame buffer interface 320 provides read commands on lines 312, addresses on lines 314, and receives data on lines 316 from the graphics memory 310.

Data is read from the graphics memory 310 via frame buffer interface 320 and received by the FIFO 330. Data from the FIFO 330 is then either filtered by the filter 340 or provided directly to the blender 360 via the filter bypass multiplexer 350. Uncompressed data from the FIFO 330 is filtered by the filter 340 when translucent source data completely covers a tile and compression is enabled. When either translucent or opaque source data only partially covers a tile or compression is disabled, the tile will be stored as uncompressed data, thus the filter 340 is bypassed using the filter bypass multiplexer 350. Compressed data from the FIFO 330 similarly bypasses the filter 340. Again, when opaque source data completely covers a tile, the corresponding data is not read from the graphics memory 310 and is thus not present in the FIFO 330. In other embodiments, the decisions to filter and compress are made based on whether source data covers a pixel as opposed to a tile. In still other embodiments, the decisions are made based on whether a group of pixels or group of subsamples are covered.

The return path from the graphics memory can take on the order of hundreds of clock cycles to complete. Accordingly, corresponding source data is delayed by retiming FIFO 385. The pixel color information is retimed and provided on line 362 to the blender 360. The output of the blender 360 is written to the graphics memory 310 via the blender bypass multiplexer 365 write logic 395, and frame buffer interface 320. If the blender is not needed, for example the source data is opaque and completely covers a tile, the blender 360 can be bypassed by the blender bypass multiplexer 365. The output of the blender bypass multiplexer 365 is written to the graphics memory 310 via the write logic 395 and frame buffer interface 320. The coordinates on lines 384 and coverage information on lines 386 are retimed by the FIFO 385 and provided on lines 392 and 394 to the write logic 395. Additionally, the coverage information on line 394 and state data (not shown) are used to control the data flow through the filter bypass multiplexer 350 and blender bypass multiplexer 365. The write control logic 395 writes data to the graphics memory 310 via the frame buffer interface 320. The frame buffer 310 provides write commands on lines 312, addresses on lines 314, and data on lines 316 to the graphics memory 310. The write control logic 395 also updates the state of the data in the TAGRAM 370.

In a specific embodiment of the present invention, the TAGRAM stores one bit for each tile indicating whether it is stored in a compressed or uncompressed format. In other embodiments, the TAGRAM may store one bit for each pixel, sub-pixel, or other group of pixels.

It will be readily apparent to one skilled in the art that this figure is a highly simplified block diagram that is useful in illustrating various methods that are consistent with embodiments of the present invention. It will also be appreciated by one skilled in the art that modifications may be made to this block diagram consistent with the present invention. For example, two or more FIFOs 330 may be included for parallel operation. Additional FIFOs 330 are used by various embodiments of the present invention in order to provide data in parallel, and thus at a faster rate, to the filter 340 and blender 360.

While the graphics processor integrated circuit is generating dynamic graphic images, the amount of data transferred between the frame buffer interface 320 graphics memory 310 can become large enough that the performance of the graphics processor is limited by the data transfer rate that can be supported. In such cases, it is highly desirable to reduce the amount of data that is stored and read from the graphics memory 310. For example, it is desirable to eliminate the storage of redundant data. In some cases, it is so desirable to reduce the amount of data stored and read from memory that some amount of error is accepted. Also, in these dynamic applications, the blender 360 processes a tremendous amount of data. Accordingly, it is desirable that the blender 360 not perform any redundant or unnecessary computations, that is, that it perform in an efficient manner.

When a newly received source data primitive covers each of the subsamples in a pixel, anti-aliasing is not needed for that pixel, and the number of subsamples that are maintained can be reduced. This process is referred to as compression. An on-chip memory, the TAGRAM 370 in this example, tracks which pixels are stored in the graphics memory 310 as compressed data. In some embodiments, such as the examples shown below, the decision to compress a pixel is made on a per-tile basis. That is, if an entire tile is covered by source data, each of the pixels in the tile is compressed. In this case, only one bit per tile is stored on chip to indicate whether the tile is stored as compressed or uncompressed data. In other embodiments, portions of pixels, or other groups of pixels may be compressed and uncompressed as a unit.

Conventionally, when source data is received, if it is translucent, that is, it has an alpha less than one, it is blended with the existing pixel color value to generate a new pixel color value. In a system that makes use of subsamples for anti-aliasing, each subsample is blended with the source data on an individual basis. In a system that uses four subsamples per pixel, four blending operations are needed for each pixel. This also means that four subsamples are read from the graphics memory 310, and that four subsamples are written back to the graphics memory 310 after blending.

In a specific embodiment of the present invention, when a tile's subsamples are stored as uncompressed data and a translucent source data primitive or triangle that covers an entire tile is received, then the pixel subsamples are filtered or reduced to a single subsample. This single subsample is then blended with the source data. Following this blending, a single updated subsample is written back to the graphics memory 310, and the TAGRAM 370 is updated to indicate that the tile is now stored as compressed data. This method is further explained in FIGS. 4A-4D below.

Figure 4A:
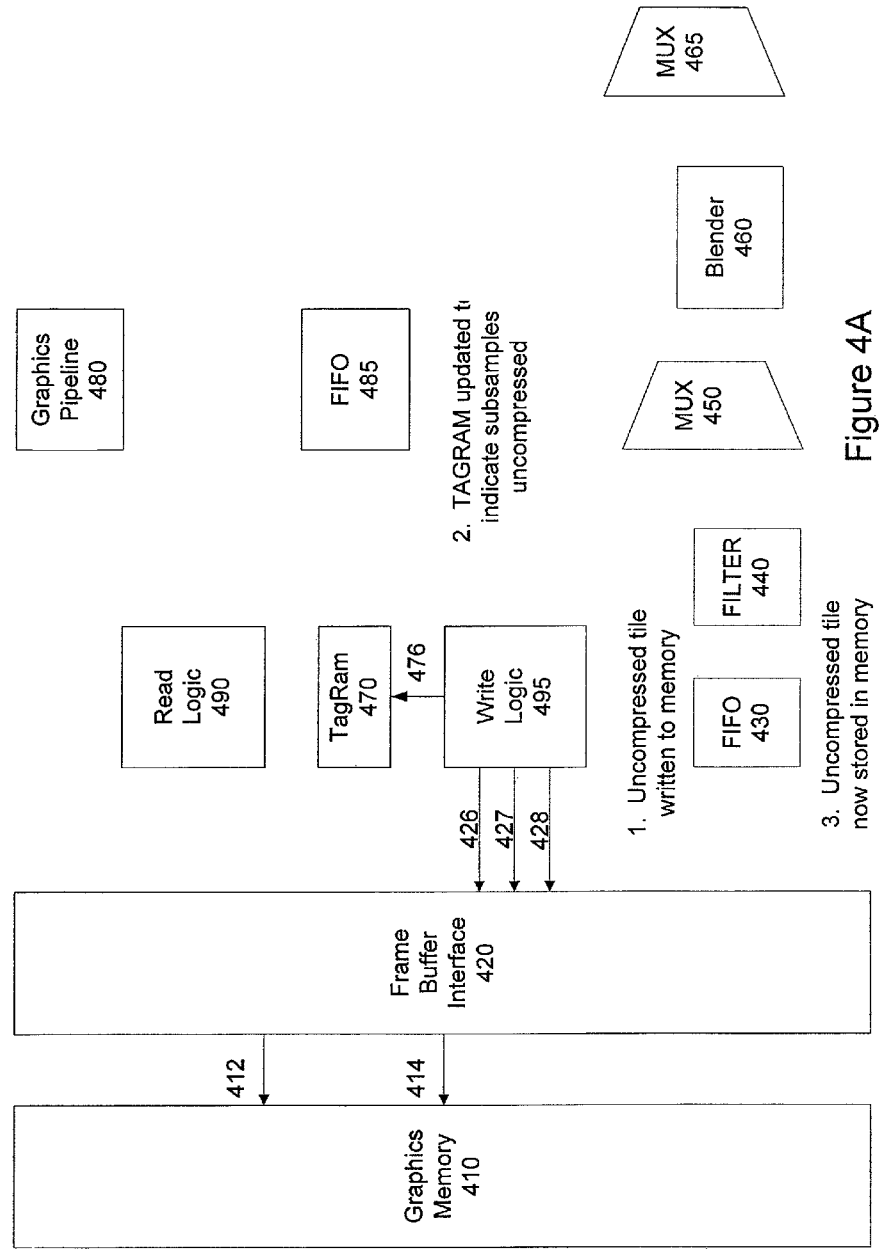

FIGS. 4A-4D illustrate the flow of data in the portion of the graphics processor shown in FIG. 3 when translucent source data that covers a tile is received. In FIG. 4A, a source data primitive or triangle that partially covers a tile has previously been received. The write logic block 495 provides a write command on line 426 to the frame buffer interface 420, and the data on data lines 428 is written to an address specified on address lines 427. At this point, the tile is stored as uncompressed data in the graphics memory 410, that is, a number of subsamples, for example four, are stored for each pixel in the tile. In other embodiments, other numbers of subsamples, for example 2 or 8 subsamples, are stored for each pixel.

Figure 4B:
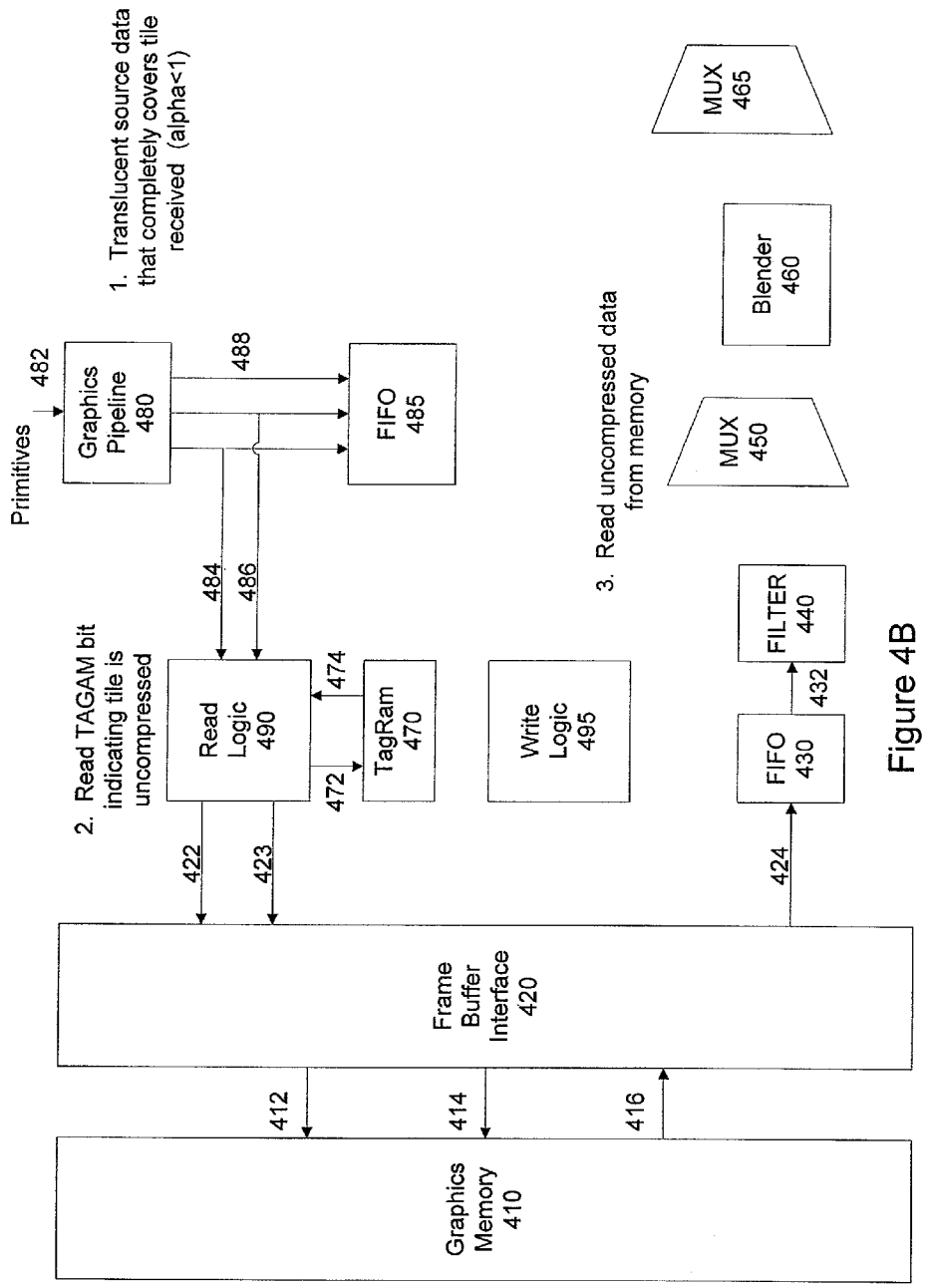

In FIG. 4B, a translucent source data primitive that completely covers the tile is received by the graphics pipeline on line 482. The read logic 490 receives coordinate and coverage information. Since the source data is translucent, it determines that a blend is needed and that a read request must be issued. (In one embodiment, a read request will be issued unless the source data is opaque and completely covers the tile.) The read logic 490 checks the TAGRAM 470 to determine if the data to be read is compressed or uncompressed, and structures the read request accordingly.

After many clock cycles, the current subsamples of a pixel in the tile are read from the graphics memory 410 by the frame buffer 420 and provided on lines 424 to the FIFO 430. The subsamples are stored in the FIFO 430 and provided to the filter 440. The filter receives these current subsamples and filters or reduces them to a single subsample. For example, in a specific embodiment of the present invention, the subsamples are averaged together. In other embodiments of the present invention, other algorithms may be used to filter or reduce the sub samples.

Figure 4D:
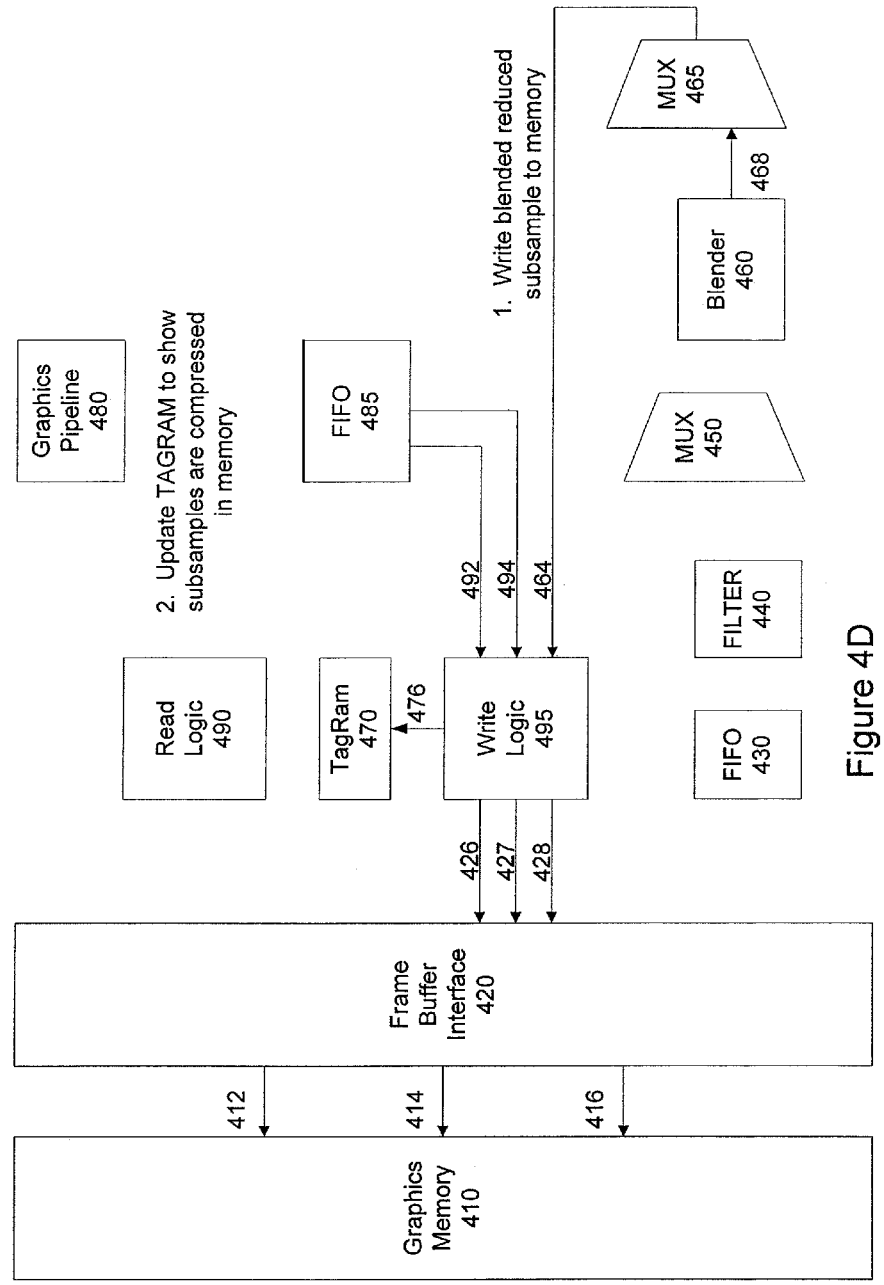

In FIG. 4C, the pixel color information is provided to the blender 460. Specifically, one reduced subsample from a pixel of corresponding source data is provided to the blender 460 by the graphics pipeline 480 via the retiming FIFO 485 on lines 462. The blender 460 blends the pixel color from the source data subsample provided by the graphics pipeline 480 with the reduced subsample from the multiplexer 450 to generate an updated subsample. In FIG. 4D, the updated subsample is provided to the write logic block 495. The write logic block 495 also receives coordinate and coverage information on lines 492 and 494. The write logic block 495 provides a write signal on line 426 instructing the frame buffer interface 420 to write the data on lines 428 to the address specified on address lines 427. The corresponding bit in TAGRAM 476 is set by the write logic 495 to indicate that the tile is now stored in a compressed manner.

Since only one subsample is written back to the graphics memory 410 instead of several, the amount of data transferred between the frame buffer interface 420 and graphics memory is reduced. Further, when data for this particular pixel is needed again, only one subsample instead of several are retrieved from the graphics memory 410, again reducing the data transferred.

When only one subsample is needed per pixel, that is the pixel (or tile) is compressed, the filter 440 is bypassed using the multiplexer 550, and the lone subsample is provided to the blender 560 directly.

The filtering or reduction typically used by embodiments of the present invention is a linear averaging, though other methods of filtering can be used. In some applications, a linear reduction of subsamples can lead to errors or undesirable results. For example, in some applications, the maximum or minimum values of a subsample are limited. When this is the case, linear averaging may result in errors. Also, some applications use an effect referred to as LOGICOP, short for logic operations. In LOGICOP, subsample values are logically operated on, for example NOR, NAND, or exclusive-OR functions are performed on the subsample values in order to achieve a specific effect. If subsamples are reduced before the logic operations are performed, the desired effect is not achieved. In these types of applications, the reduction of subsamples can be disabled, either by the processor itself recognizing the application as one where compression should be disabled, or by the application itself.

Even where linear filtering is used, loss or errors can result in some circumstances. As an example, a four subsample pixel may have two red subsamples and two white subsamples. If these are linearly filtered, the result is one pink subsample. If the previously white subsamples are later covered with opaque red source data, the resulting pixel will be reddish-pink. However, if compression was never performed, the resulting pixel would be red. In this case, the white has effectively bled through due to the employment of this compression algorithm.

These errors can be eliminated in some embodiments of the present invention by limiting compression to where each of the subsamples has the same color. Other embodiments of the present invention limit these errors by having a threshold on the difference in color among the subsamples. If the threshold is exceeded, compression is not performed. This threshold may be on a per-color channel basis, cumulative for each of the colors, or the threshold may be determined by other methods. More specifically, the difference in the red, green, and blue components or channels among the subsamples can be determined. If the difference in any one channel is above a threshold, compression is not allowed. This threshold can be different for each color channel, for example it can be lower in the green channel than for the other colors. Alternately, the cumulative difference for each of the color channels among the subsamples can be determined and compared to a threshold value. This threshold value can be programmably or otherwise changed or varied depending on the application, user preference, or other criteria.

This concept of allowing compression to occur if the colors are within a threshold can be applied to source data as well. A circuit known as the coalesce buffer (not shown) resides in the graphics pipeline. If two adjacent source data primitives cover different subsamples of the same tile, their data is combined or coalesced into a single tile. If the colors of each pixel's subsamples within this tile are identical, the tile may be reduced or compressed. If some loss is acceptable, the tile may be reduced if each pixel's subsamples are close in color, for example, the color difference between primitives is less than a threshold. The color difference can be determined in the same manner as described above, or it may be determined according to a number of various methods or algorithms.

Figure 5:
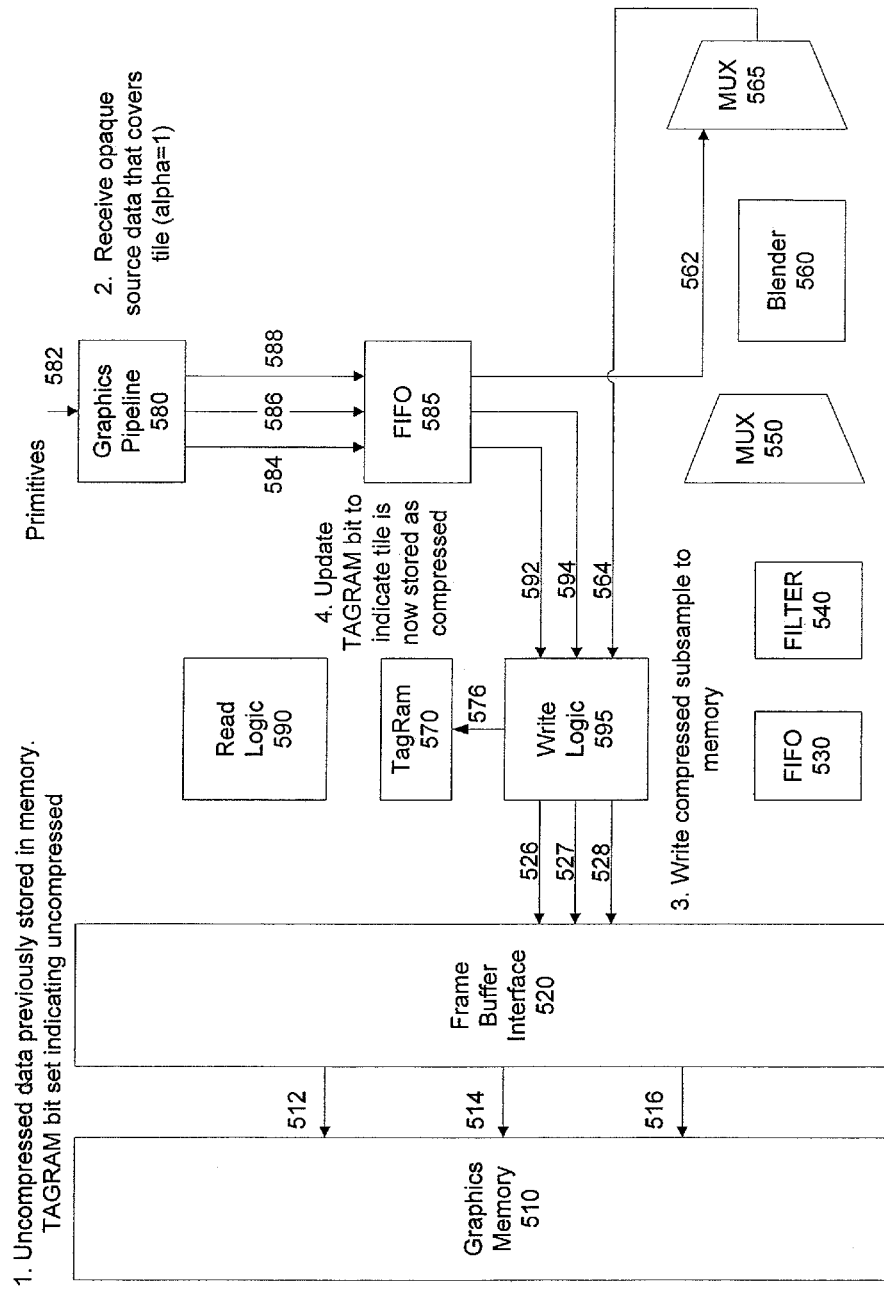
FIG. 5 illustrates the flow of data in the portion of the graphics processor shown in FIG. 3 when opaque source data that covers a tile is received.

FIG. 5 illustrates the flow of data in the portion of the graphics processor shown in FIG. 3 when opaque source data that covers a tile is received by the graphics pipeline 580. When this situation arises, the newly received source data does not need to be blended with previous subsamples, because the previous subsamples are hidden behind the newly received opaque source data. Accordingly, the blender can be bypassed with the blender bypass multiplexer 565.

In this example, a tile has been previously written to the memory 510 in an uncompressed format. A source data primitive or triangle that is opaque and completely covers the tile is received on bus 582 by the graphics pipeline 580. The graphics pipeline provides coordinate information on lines 584, coverage information on lines 586 and pixel color information on lines 588 to the FIFO 585. Again, since the source data is opaque and the tile is completely covered, the existing subsamples do not need to be read, and no read request is issued by the read logic 590. Also, since the source is opaque, and no existing subsamples are read, the blender 560 is not needed and is bypassed by bypass multiplexer 565.

The pixel color information on lines 588 is retimed and provided on line 562 to the bypass multiplexer 565. The output of the multiplexer 565 is provided to the write logic 595. The write logic 595 also receives coordinates on lines 592 and coverage information on lines 594, and writes the compressed data to the specified address. The write logic 595 updates the corresponding bit in the TAGRAM 570 to indicate that the tile is now stored as compressed data.

In the above examples, the pixels in a tile are compressed when source data covers the tile. Conceptually, when source data covers a tile, anti-aliasing is not as important, so individual subsample values do not need to be maintained. When a compressed tile is then only partly covered by new source data, anti-aliasing is again needed, and thus the tile is uncompressed. How this is done according to one embodiment of the present invention is shown in the following example.

Figure 6A:
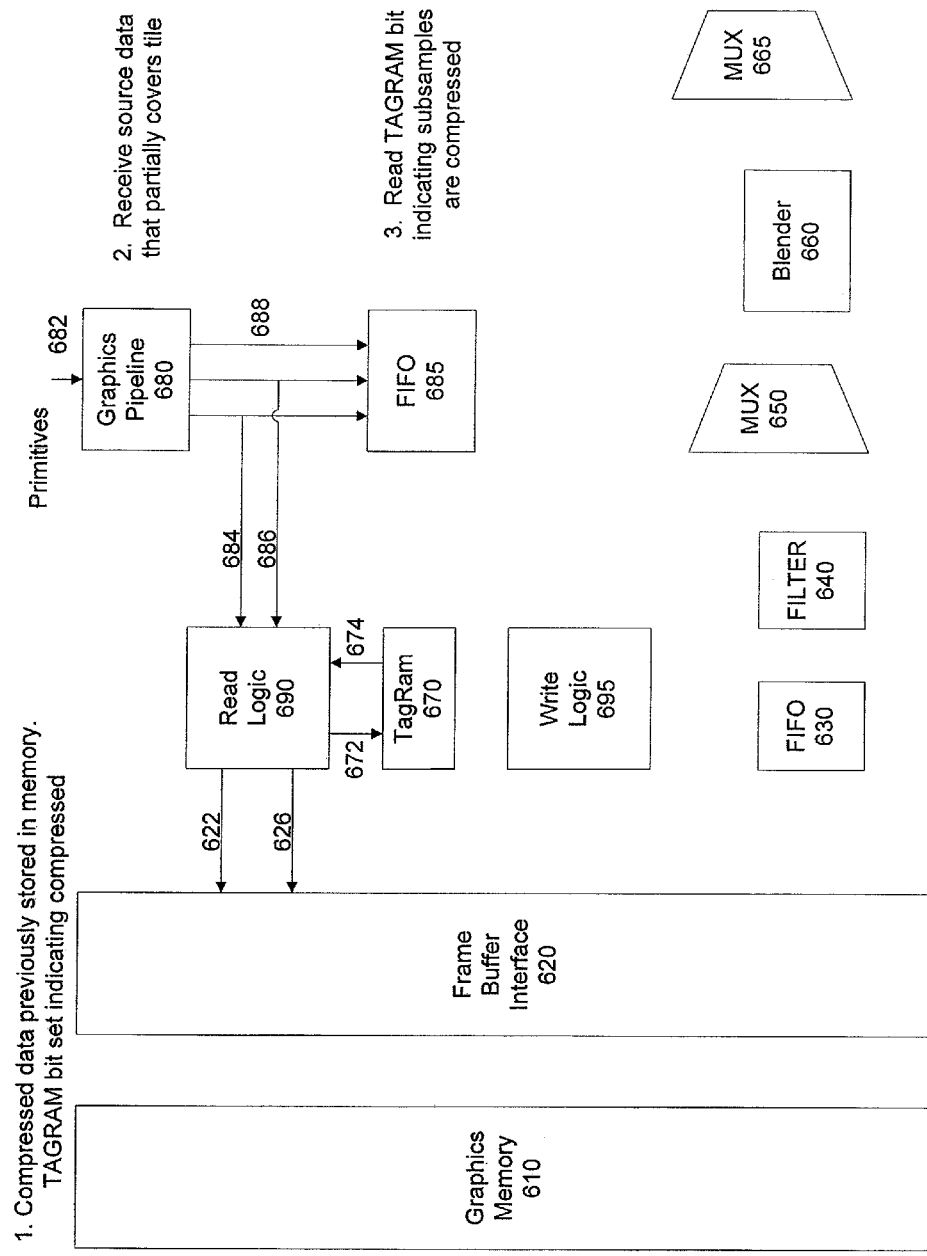
FIGS. 6A-6C illustrate the flow of data in the portion of the graphics processor shown in FIG. 3 when source data that only partly covers a tile is received.
Figure 6B:
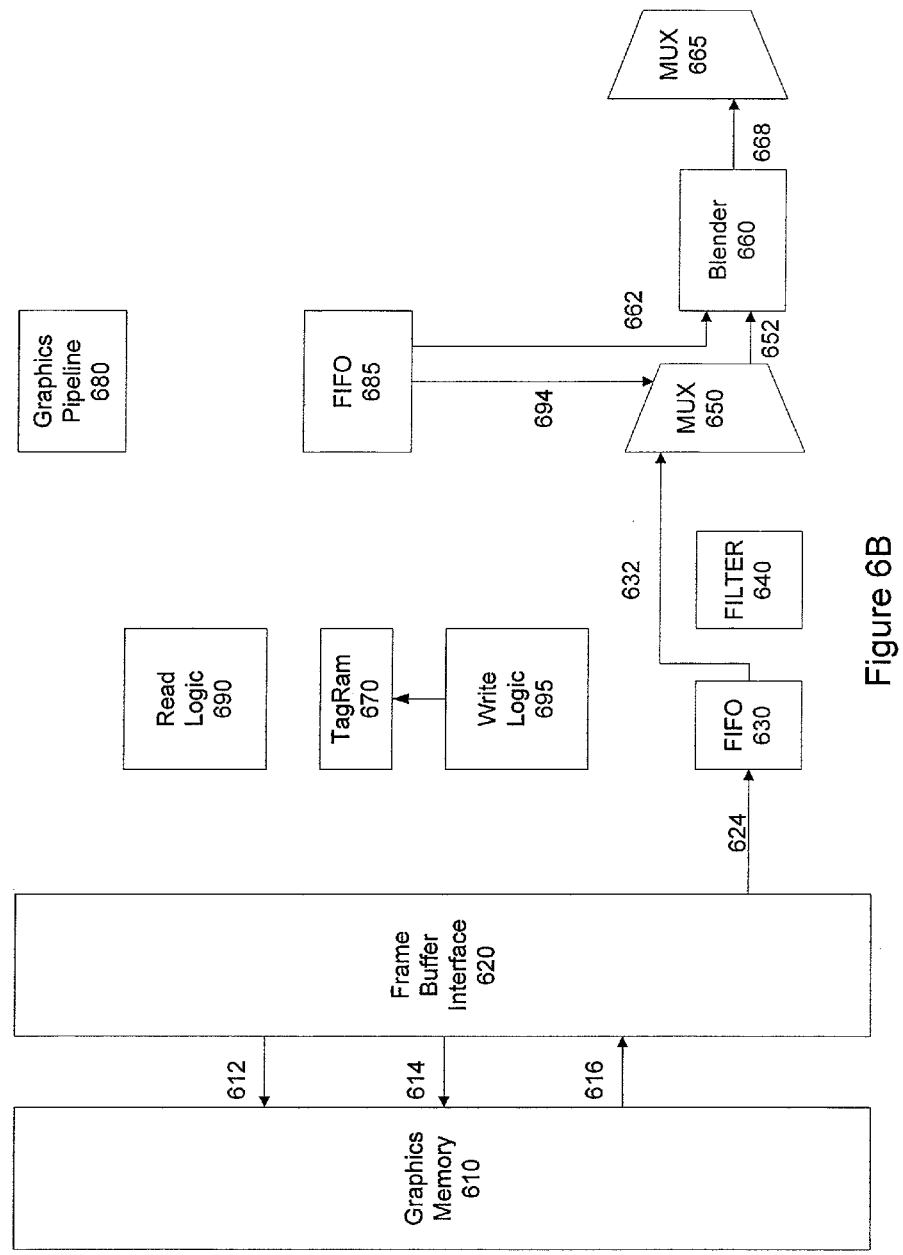
Figure 6C:
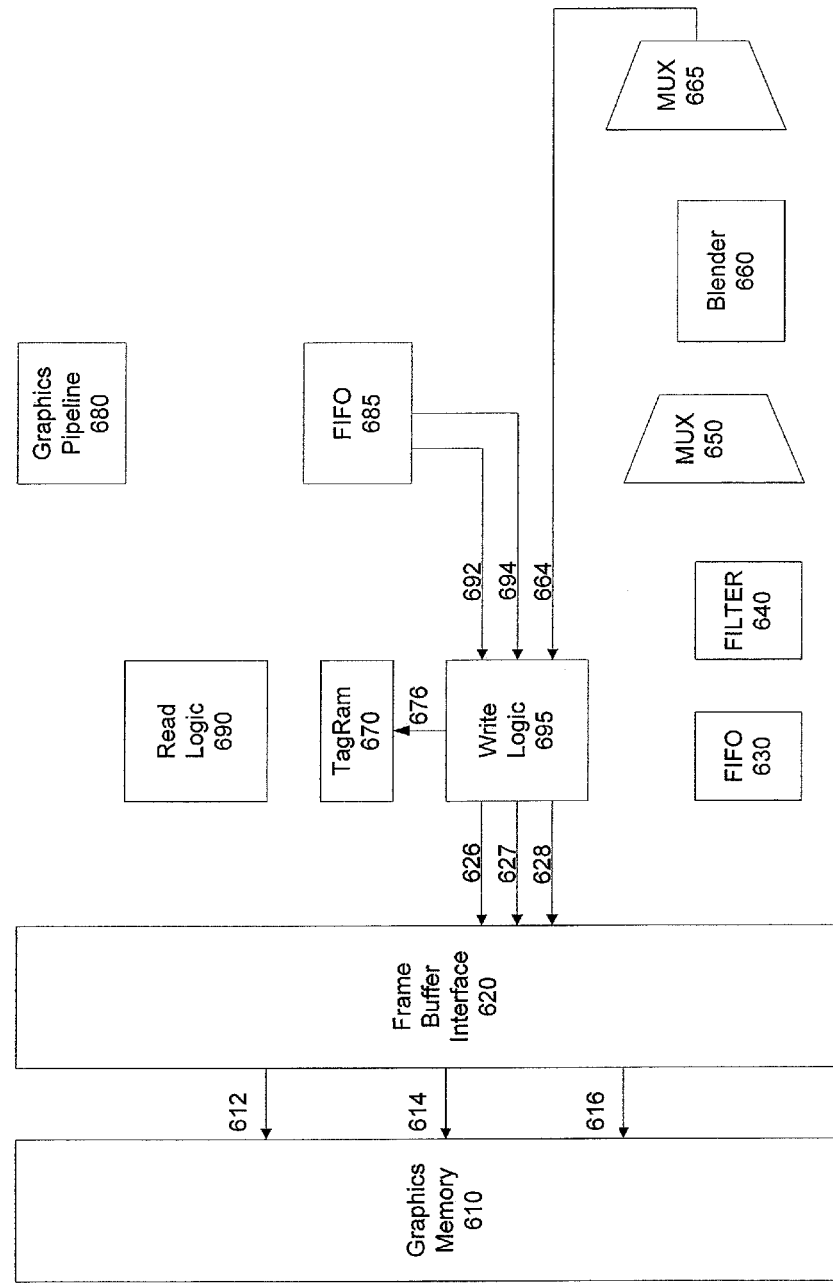

FIGS. 6A-6C illustrate the flow of data in the portion of the graphics processor shown in FIG. 3 when source data that partly covers a tile is received. In FIG. 6A, data has been previously stored for a tile in compressed format, for example by one of the methods shown in FIG. 4A-D or 5. A source data primitive or triangle that only partially covers a compressed tile is received on bus 682 by the graphics pipeline 680. The read logic 690 receives coordinates on lines 684 and coverage information on lines 686. Since the tile is only partially covered, a read request is issued The read logic circuit requests data from the TAGRAM 670 via line 672 and reads a bit on line 674. This bit indicates whether the needed data is stored in a compressed or uncompressed format, and the read logic 690 formats its request to the frame buffer interface 620 appropriately. The read logic 690 provides a read signal on line 622 and address on lines 626 to the frame buffer interface 620. The coordinate, coverage, and pixel colors are provided on lines 684, 686 and 688 to the retiming FIFO 685.

In FIG. 6B, after many clock cycles, the compressed tile is read from the graphics memory 610 and provided to the FIFO 630 by the frame buffer interface 620. Since the data is compressed, the filter is bypassed using the filter bypass multiplexer 650. When the source data is translucent, data is provided to the blender 660. When the source data is opaque, the blender is not needed and can be bypassed using the blender bypass multiplexer 665.

When the source data is translucent, the blender blends the subsamples and the pixel color from the FIFO 685 on lines 662 on a per-subsample basis. More specifically, the one subsample from graphics memory 610 is expanded and then blended with each of several pixel color subsamples on lines 662. In a specific embodiment, four subsamples pixel colors are received on lines 662, though other numbers of subsamples, such as two or eight subsamples may be received. When the source data is opaque, the one subsample from graphics memory 610 is expanded. The expanded subsamples are then replaced or retained with the new opaque subsample color data on line 662 as dictated by the coverage information on line 694.

In FIG. 6C, the updated subsamples are stored as uncompressed data in the graphics memory 610. Specifically, the updated subsamples are provided to the write logic block 695. Coordinate and coverage information is received on lines 692 and 694, and the updated subsamples are written. The write logic block 695 also updates the TAGRAM 676 to indicate that this tile is now stored as uncompressed data.

Figure 7:
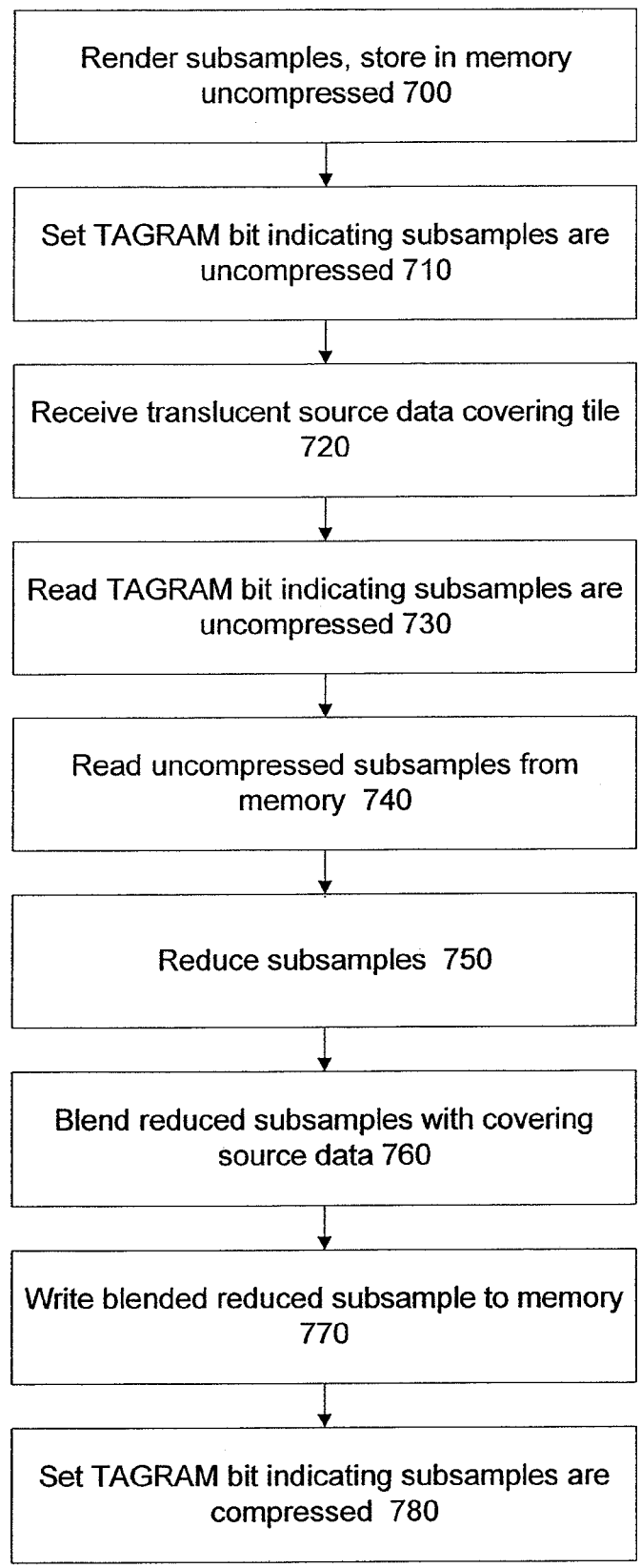
FIG. 7 is a flow chart illustrating a method of reducing the number of subsamples stored in a graphics memory when translucent source data that covers a tile is received.

FIG. 7 is a flow chart illustrating a method of reducing the number of subsamples stored in a graphics memory when translucent source data that covers a tile is received. In act 700, a number of subsamples for a pixel are rendered and stored in memory as uncompressed data. In act 710, the corresponding TAGRAM bit is set indicating that the subsamples are stored as uncompressed data. A translucent source data primitive or triangle that covers the pixel's tile is received in act 720. In act 730, the TAGRAM bit indicating that data is currently uncompressed is read. This indicates that several subsamples must be read from memory. The subsamples are then read in act 740. The previously stored subsamples are filtered or reduced in act 750. The reduced subsample is then blended with the source data in act 760. The blended reduced subsample is written to graphics memory in act 770, and the TAGRAM is updated in act 780.

Figure 8:
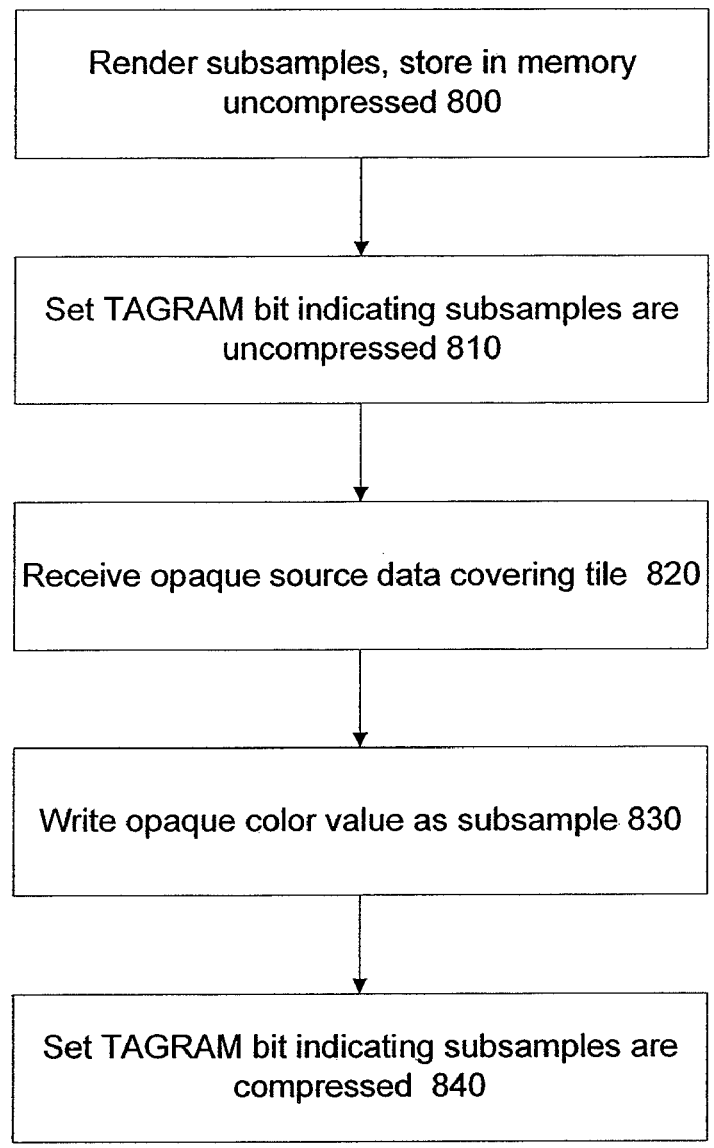
FIG. 8 is a flow chart illustrating a method of reducing the number of subsamples stored in a graphics memory when opaque source data that covers a tile is received.

FIG. 8 is a flow chart illustrating a method of reducing a number of subsamples stored in a graphics memory when opaque source data that covers a tile is received. In act 800, a number of subsamples of a pixel are rendered and stored and a graphics memory as uncompressed data. In act 810, a TAGRAM bit is set indicating that the tile is stored as uncompressed data. An opaque source data primitive or triangle that covers the pixel's tile is received in act 820. In act 830, the opaque color value is stored as a subsample in memory. The TAGRAM is updated in act 840 to show that the tile is now stored as compressed data.

Figure 9:
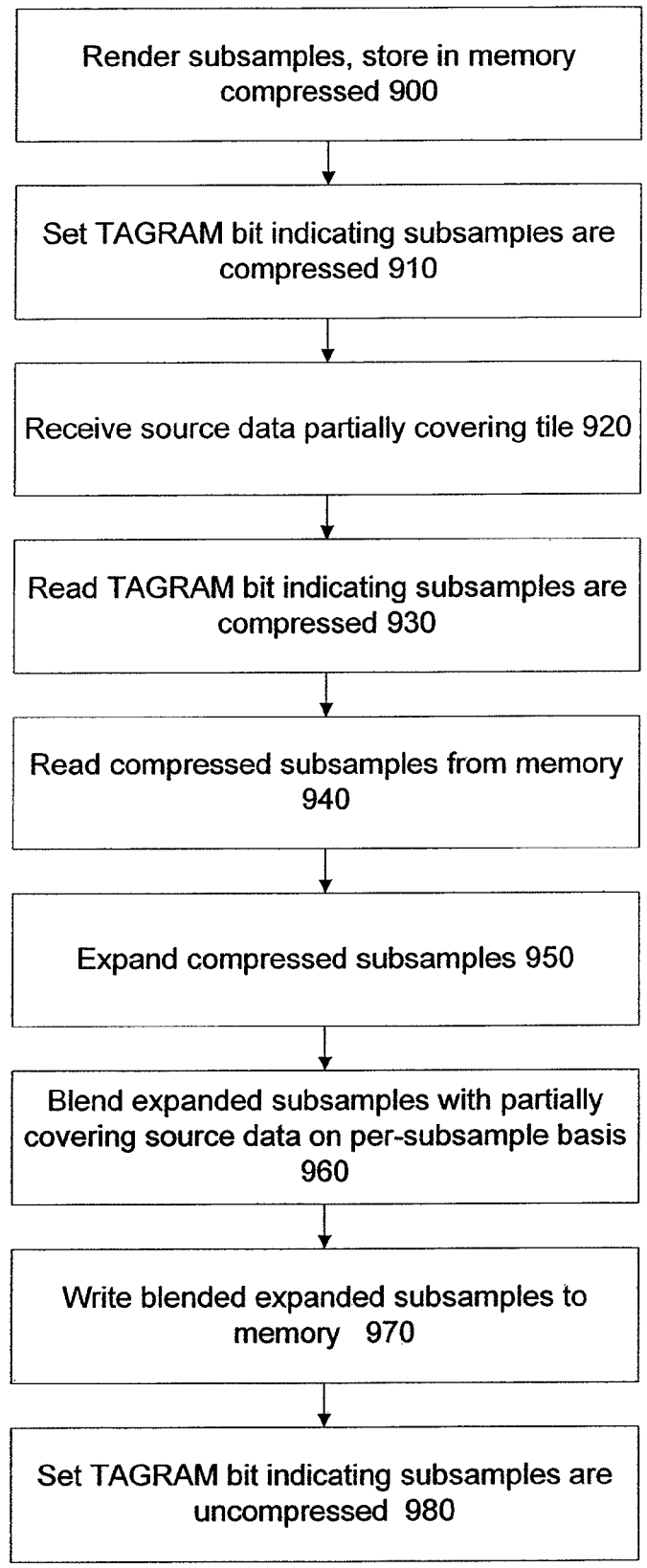
FIG. 9 is a flow chart illustrating events following the reception of source data that partly covers a tile that has been previously compressed.

FIG. 9 is a flow chart illustrating events following the reception of source data that partly covers a tile that has been previously reduced. In act 900, a tile including a pixel has been previously stored in memory as compressed data, for example using one of the methods shown in FIG. 7 or 8. In act 910, the corresponding TAGRAM bit is set to indicate that the tile is stored as compressed data. A source data primitive or triangle that only partially covers the tile is received in act 920. In act 930, the TAGRAM is read, and the corresponding bit indicates that the tile is stored as compressed data. Accordingly, only one subsample per pixel is retrieved from the graphics memory. In act 940, the compressed subsample for each pixel is read from memory and expanded in act 950. When the source data is translucent, the compressed subsample is expanded and blended with the newly received source data in act 960 on a per-subsample basis. When the source data is opaque, blending is not required, rather, the compressed subsample is expanded and the expanded subsamples are replaced by the newly received source data or retained as dictated by the coverage information. In act 970, the expanded blended subsamples are written back to the memory, and the TAGRAM is updated to indicate that the tile is stored as uncompressed data in act 980.

The various embodiments have been described as applying to systems using anti-aliasing. However, these circuits, methods, and apparatus can be used in systems or applications that do not use anti-aliasing. In such a system, or in a system operating without anti-aliasing, only one value for each pixel is stored. In this case, the amount of data transferred between the graphics processor and its memory can be further reduced by compressing a number of pixels. Specifically, a number of pixels can be treated the same as a number of samples were in the examples above.

For example, when opaque source data covers a tile or other group of pixels, several pixels can be compressed and written back to memory as a single value. If translucent source data that covers a tile or other group of pixels is received, several pixels can be read from memory, compressed, and the compressed value can be blended with the source data. The resulting value can then be written back to memory. In each case, a TAGRAM can be used to track which tiles are compressed, as in the examples above. The number of pixels that are compressed to a single value will depend on the implementation used, such as the number of bits per color per pixel and the amount of data allocated for each tile. For example, one embodiment of the present invention uses 32 bytes by four lines for a tile, which can be configured as four by two pixels if anti-aliasing is used, and eight by four pixels if anti-aliasing is not used. Other configurations are possible if a different number of bits per pixel are used.

When entire pixels are compressed, the concern regarding the possible losses as described above is greater than when subsamples are compressed. In this case, it may be desirable to reduce or eliminate the color difference threshold. For example, it may be desirable in some applications to only allow pixel level compression when each of the pixels to be compressed have the same value.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
   a first-in-first-out memory to receive a first source data primitive covering at least one pixel including a first pixel;
   a frame buffer interface to read a first number of subsamples of the first pixel from an external graphics memory;
   a filter to receive the first number of subsamples of the first pixel and to filter the first number of subsamples of the first pixel to a second number of subsamples of the first pixel, the second number of subsamples less than the first number of subsamples; and
   a blender to receive the second number of subsamples of the first pixel and a second number of subsamples of the first source data primitive, and to blend the second number of subsamples of the first pixel with the second number of subsamples of the first source data primitive to generate a second number of updated subsamples,
   the frame buffer interface to further receive the second number of updated subsamples and store the second number of updated subsamples in the external graphics memory.

2. The integrated circuit of claim 1 further comprising a tagRAM to store a flag indicating that the number of subsamples stored for the first pixel is the second number.

3. The integrated circuit of claim 1 wherein the integrated circuit is a graphics processor.

4. The integrated circuit of claim 1 wherein the second number is one.

5. The integrated circuit of claim 1 wherein the first number is four and the second number is one.

6. The integrated circuit of claim 1 wherein the at least one pixel comprises a tile of pixels.

7. The integrated circuit of claim 6 wherein the tile of pixels comprises an array having a size of one of the group consisting of four by four, eight by four, four by eight, and eight by eight pixels.

8. An integrated circuit comprising:
   a first-in-first-out memory to receive source data primitives;
   a frame buffer interface to read subsamples for pixels from an external graphics memory;
   a filter to receive the subsamples from the frame buffer interface and to filter the subsamples; and
   a blender to receive the filtered subsamples from the filter and subsamples of the first source data primitive, and to blend the second number of subsamples of the first pixel with a second number of subsamples of the first source data primitive to generate updated subsamples,
   the frame buffer interface to further receive the updated subsamples from the blender and store the updated subsamples in the external graphics memory.

9. The integrated circuit of claim 8 wherein the filter is a linear filter.

10. The integrated circuit of claim 8 wherein the integrated circuit is a graphics processor.

11. A method of generating pixels comprising:
    receiving a first source data primitive covering a tile, the tile including a first pixel; and
    if the first source data primitive is translucent, then receiving a first number of subsamples of the first pixel from a memory;
    filtering the first number of subsamples of the first pixel to a second number of subsamples of the first pixel, the second number of subsamples less than the first number of subsamples;
    blending the second number of subsamples of the first pixel with a second number of subsamples of the first source data primitive to generate a second number of updated subsamples; and
    storing the second number of updated subsamples in the memory; otherwise if the source data primitive is opaque, then storing a second number of subsamples of the first source data primitive as an updated subsample in the memory.

12. The method of claim 11 further comprising:
    receiving a second source data primitive partially covering the tile, the tile including a second pixel;
    receiving a first number of subsamples of the second pixel from the memory;
    blending the first number of subsamples of the second pixel with a first number of subsamples of the second source data primitive to generate a first number of updated subsamples; and
    storing the first number of updated subsamples in the memory.

13. The method of claim 11 further comprising:
    receiving a second source data primitive partially covering the tile, the tile including a second pixel;
    receiving a second number of subsamples of the second pixel from the memory;

blending the second number of subsamples of the second pixel with a first number of subsamples of the second source data primitive to generate a first number of updated subsamples; and storing the first number of updated subsamples in the memory.

14. The method of claim 11 further comprising:

receiving a third source data primitive covering the tile, the tile including a third pixel, where the third source data primitive is translucent;

receiving a first number of subsamples of the third pixel from a memory; and if a first criteria is met, then filtering the first number of subsamples of the third pixel to a second number of subsamples of the third pixel, the second number of subsamples less than the first number of subsamples;

blending the second number of subsamples of the third pixel with a second number of subsamples of the third source data primitive to generate a second number of updated subsamples; and storing the second number of updated subsamples in the memory, otherwise if the first criteria is not met, then blending the first number of subsamples of the third pixel with a first number of subsamples of the third source data primitive to generate a first number of updated subsamples; and storing the first number of updated subsamples in the memory.

15. The method of claim 14 wherein the first criteria is that each of the first number of subsamples of the third pixel have the same color value.

16. The method of claim 14 wherein the first criteria is that each of the first number of subsamples of the third pixel have a color value within a threshold value.

17. The method of claim 14 wherein the first criteria includes that a blue component of each of the first number of subsamples of the third pixel have a value within a first threshold value.

18. The method of claim 17 wherein the first criteria further includes that a green component of each of the first number of subsamples of the third pixel have a value within a second threshold value, the second threshold value less than the first threshold value.

19. The method of claim 11 wherein the filtering and blending are performed by a graphics processor.

20. The method of claim 11 wherein the first number is four and the second number is one.

* * * * *